United States Patent Office 2,893,770
Patented July 7, 1959

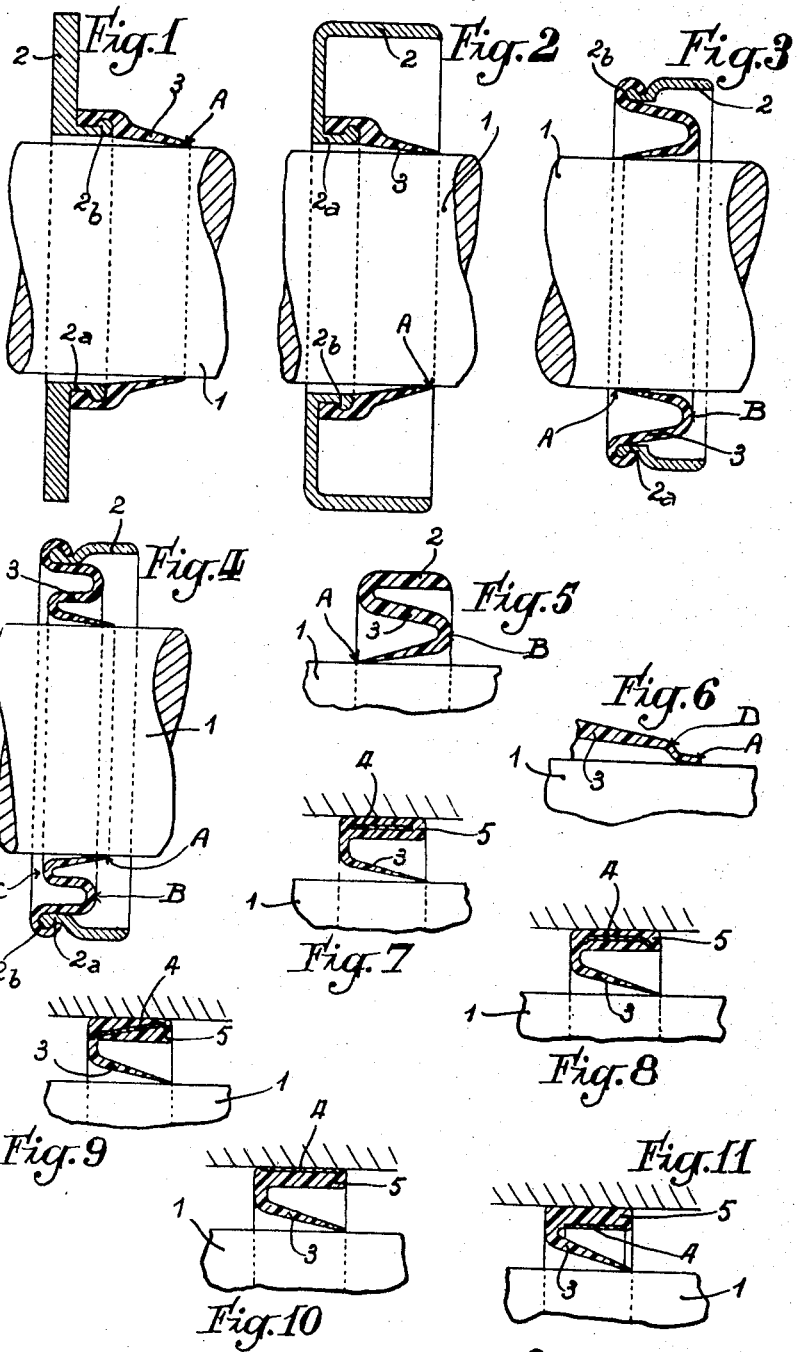

2,893,770

OIL SEALS

Pierre Poncet, Lyon, France, assignor of one-half to Elie Picat, Lyon (Rhone), France Application June 2, 1952, Serial No. 291,100

Claims priority, application France June 5, 1951

1 Claim. (Cl. 288—3)

My invention relates to oil seals used in connection with shafts or like moving parts of machinery to prevent oil leakage, for instance from bearings, casings and the like.

Such oil seals are generally formed of a flexible sleeve, for instance made of leather, which is pressed against the shaft by an annular spring, the said sleeve being secured within a hollow ring which fits into an appropriate housing of the bearing, casing or the like. Such oil seals are satisfactory in use under normal conditions, but they are expensive owing to the high quality of the leather required for their manufacture and to the number of parts which they comprise. They are not resistant to relatively high temperatures. It has also been proposed to manufacture oil seals from rubber or rubber substitutes, but this material is still more affected by heat than leather.

A first object of my invention is to provide an oil seal which will withstand relatively high temperatures, such as may be reached in the crankcase of internal combustion engines, in high duty bearings, etc.

Another object of my invention is an oil seal formed of a sleeve moulded from polyamids on an annular retaining member.

The retaining member may be in the form of a flat washer having a laterally beaded inner edge and the conical sleeve is so moulded on this inner edge that the beaded portion thereof is embedded into the moulded material and thus forms a unit with the retaining member. Such an oil seal is cheap in manufacture and it is highly efficient. It is unaffected by temperatures well above 100° C. and the power losses due to friction of the inner lip of the sleeve on the shaft are much smaller than with the known oil seals made of leather or of rubber.

Instead of being a flat washer the retaining member may also be in the form of a hollow ring with an inturned beaded inner edge.

The retaining member may also be made of plastic material moulded with the sleeve itself. The manufacture is simplified since the article is moulded in one single operation without having to prepare a metallic retaining member. The retaining member may be re-inforced by a metallic annular core, if necessary.

When high flexibility is required of the sleeve, for instance in the case of oil seals adapted to be mounted on shafts which do not rotate perfectly true, the sleeve may be formed with circular folds or corrugations. This increased flexibility of the sleeve is also of advantage in the case of materials which have a tendency to shrink, which is often the case with polyamids.

In the annexed drawings:

Fig. 1 is a longitudinal section of an oil seal according to my invention wherein the retaining member is in the form of a flat metallic washer.

Fig. 2 is a section of a modified construction wherein the retaining member is a hollow metallic ring.

Figs. 3 and 4 illustrate in section two oil seals wherein the retaining member is a cylindrical metallic ring and wherein the sleeve is formed with circular folds or corrugations.

Fig. 5 shows a construction wherein the retaining member is a ring of plastic material moulded with the sleeve itself.

Fig. 6 is a large scale partial section showing the lip of the sleeve.

Figs. 7 to 11 illustrate examples of oil seals according to my invention wherein the retaining member is made of plastic material and is re-inforced by a metallic annular core.

Fig. 1 reference numeral 1 designates a shaft on which an oil seal is to be mounted. This oil seal comprises a metallic washer 2 having a diameter slightly larger than shaft 1, the said washer being formed with a laterally turned inner edge 2a which terminates into a circular bead 2b. This washer 2 supports a sleeve 3 made of polyamid material. Sleeve 3 is of frustro-conical form with a relatively thick larger base and a thin smaller base. Edge 2a together with the beaded portion 2b thereof is embedded into the larger base while the smaller base forms the circular lip which contacts at A the periphery of shaft 1.

Sleeve 3 is moulded in a mould comprising a recess for receiving washer 2. The oil seal is thus directly obtained by moulding without any further operation. The high elasticity of polyamid compositions ensures the necessary pressure of the lip on the shaft and dispenses with any annular spring. These compositions also retain their physical characteristics at temperatures of about 150° C. at which leather or rubber are rapidly destroyed. Washer 2 is secured in use against a wall or partition, or it is inserted as a press fit into an appropriate housing.

In the construction of Fig. 2 the retaining member 2 is in the form of a hollow ring comprising a cylindrical outer portion and an inner flat portion disposed at one end of the cylindrical portion, the said flat portion having a laterally or inwardly turned edge 2a with a beaded end 2b. The corresponding sleeve 3 is exactly the same as in Fig. 1 and it is supported in the same manner by the turned edge 2a. The cylindrical shape of the retaining member 2 facilitates the insertion of the oil seal into a cylindrical housing as a press fit.

In Fig. 3 the retaining member is a cylindrical ring having a slightly inturned edge 2a terminating into a beaded end 2b. The sleeve 3 is secured to the retaining member thus formed by having the beaded edge 2a embedded into its larger base, as in the case of Figs. 1 and 2, but here the said sleeve is not merely in the form of the frustrum of a cone. It comprises a first frustro-conical portion extending within ring 2 and followed by a circular fold or corrugation B which is in turn followed by a second frustro-conical portion terminating into the contacting or sealing lip which contacts the shaft 1 at A. In other words the longitudinal section of the sleeve is in the form of a V with a rounded lower tip. This construction provides a high flexibility or elasticity of the sleeve in a transverse direction. While the oil seal of Figs. 1 and 2 requires shafts rotating substantially true, the seal of Fig. 3 may ensure tightness around shafts which are poorly centered, as it often occurs in gearings which have been repaired.

In Fig. 4 the sleeve 3 comprises two successive folds or corrugations B and C, which still enhance its transverse flexiblity.

In the construction of Fig. 5 the retaining member 2 is itself made of polyamid material and it is moulded together with the sleeve 3. The oil seal is thus wholly manufactured in a single moulding operation without having to prepare a metallic ring or washer and to dispose the same within the mould. The manufacturing costs are thus reduced and owing to the flexibility of the polyamid material the oil seal may be more easily mounted into more or less defective housings. It will be understood that the sleeve which has been supposed of the same construction as in Fig. 3 could as well be similar to the sleeve of Fig. 1, or of Fig. 4.

Fig. 6 shows the preferred construction of the contacting lip of the sleeve. The end portion of the sleeve is of reduced diameter, a shoulder being formed as at D in the immediate vicinity of the tip A. This arrangement provides a certain amount of flexibility to the lip which is unaffected by the eventual shrinkage of the other portions of the sleeve. Also if the sleeve becomes deformed in service, the point of contact with the shaft still remains in the immediate proximity of the tip A while othewise it could be displaced towards the left of Fig. 6 for a noticeable extent, which would be detrimental to oil tightness.

When it is desired to combine the advantages of the metallic retaining member (more particularly stiffness) and of the retaining member made of thermoplastic material (more particularly its flexibility which ensures tightness in poorly machined housings), there may be used a ring of thermoplastic material re-inforced by a metallic core, as illustrated in Figs. 7 to 11.

In Fig. 7 the metallic core 4 is cylindrical and it is embedded in a cylindrical ring 5 of thermoplastic material forming one and the same part with the sleeve 3. In Fig. 8 the edges of the metallic core are turned inwardly in order to eliminate cutting edges liable to damage the thermoplastic material when the oil seal is inserted into the corresponding housing, for instance with a hammer. Of course one only of the core edges could be turned inwardly. In Fig. 9 the core is shown as slightly frusto-conical.

Of course the core could be disposed nearer to the periphery of the thermoplastic ring 4 than to the inner surface thereof, or conversely. In the first case the core may form even an outer ring 4 surrounding the thermoplastic ring 5, as illustrated in Fig. 10, while in the second case it may form a base 4 on which the thermoplastic ring 5 is moulded, as shown in Fig. 11, the said base preventing ring 5 from shrinking.

I claim:

An oil seal to prevent oil leakage around a relatively rotating shaft, comprising a metallic annular retaining member having an inner substantially cylindrical portion for passage of said shaft, said portion terminating in a free circular end of increased outer diameter with respect to the adjacent zone of said portion; and a substantially frusto-conical sleeve made of polyamide material, having its larger base directly secured by molding to said free end which is embedded thereinto, said sleeve being of decreasing thickness from its larger base to its smaller base which is in the form of a thin circular end lip adapted to bear elastically on said shaft along the whole periphery thereof, and said lip being of lesser inner diameter than the next adjacent portion of said sleeve and being separated therefrom by a diameter reducing shoulder disposed close to said lip.

References Cited in the file of this patent

UNITED STATES PATENTS

| | | |
|---|---|---|
| 1,510,806 | Snider | Oct. 7, 1924 |
| 2,028,634 | Walker | Jan. 21, 1936 |
| 2,114,908 | Peterson | Apr. 19, 1938 |
| 2,145,928 | Heinze et al. | Feb. 7, 1939 |
| 2,252,554 | Carothers | Aug. 12, 1941 |
| 2,267,930 | Leonard | Dec. 30, 1941 |
| 2,358,536 | Reynolds | Sept. 19, 1944 |
| 2,386,496 | Northup | Oct. 9, 1945 |
| 2,415,888 | Joy | Feb. 18, 1947 |
| 2,520,092 | Fredrickson et al. | Aug. 22, 1950 |
| 2,565,701 | Stewart | Aug. 28, 1951 |
| 2,568,056 | Corder | Sept. 18, 1951 |
| 2,606,779 | Jagger | Aug. 12, 1952 |
| 2,635,907 | Heimbuch | Apr. 21, 1953 |
| 2,659,617 | Cobb | Nov. 17, 1953 |

FOREIGN PATENTS

| | | |
|---|---|---|
| 854,279 | France | Apr. 9, 1940 |

OTHER REFERENCES

"Nylon Parts" (Recknagel), published in Product Engineering, February 1952.